US005513362A

United States Patent [19]
Urano et al.

[11] Patent Number: 5,513,362
[45] Date of Patent: Apr. 30, 1996

[54] METHOD OF AND APPARATUS FOR NORMALIZATION OF A FLOATING POINT BINARY NUMBER

[75] Inventors: Miki Urano; Takashi Taniguchi, both of Osaka, Japan

[73] Assignee: Matsushita Electric Industrial Co., Ltd., Osaka, Japan

[21] Appl. No.: 49,433

[22] Filed: Apr. 20, 1993

[30] Foreign Application Priority Data

Apr. 23, 1992 [JP] Japan .................................... 4-104487

[51] Int. Cl.⁶ ..................................................... G06F 7/38
[52] U.S. Cl. ........................................... 395/800; 364/748
[58] Field of Search .............................. 395/800; 364/748

[56] References Cited

U.S. PATENT DOCUMENTS

| | | | |
|---|---|---|---|
| 3,752,394 | 8/1973 | Igel | 364/716 |
| 3,766,371 | 10/1973 | Suzuki | 364/784 |
| 4,366,548 | 12/1982 | Kregness et al. | 364/748 |
| 4,779,220 | 10/1988 | Nukiyama | 364/748 |
| 5,103,418 | 4/1992 | Birger | 364/748 |
| 5,111,421 | 5/1992 | Molnar et al. | 364/748 |
| 5,187,678 | 2/1993 | Hori | 364/748 |
| 5,267,186 | 11/1993 | Gupta et al. | 364/748 |
| 5,386,377 | 1/1995 | McClure | 364/787 |

FOREIGN PATENT DOCUMENTS

| | | |
|---|---|---|
| 1-282633 | 11/1989 | Japan . |
| 3-12735 | 1/1991 | Japan . |
| 4-153729 | 5/1992 | Japan . |

*Primary Examiner*—Alyssa H. Bowler
*Assistant Examiner*—John Harrity
*Attorney, Agent, or Firm*—Willian Brinks Hofer Gilson & Lione

[57] ABSTRACT

A post-processing is executed on a mantissa M and an exponent E of a floating point binary number as a result of subtraction for example, thereby to obtain a mantissa m and an exponent e of the result of the post-processing. Therefore, an output (E−1) of a decrementer and an output (amount of cancelling of mantissa LSA) of an advancing 1 detecting circuit are entered into a minimum value selecting circuit. The minimum value selecting circuit is adapted to set a shift amount SH to (E−1) and a magnitude-relation judging signal CR to 1 when (E−1) is smaller than LSA (that is, when a denormalize processing is required). When (E−1) is not smaller than LSA (that is, when a normalize processing is required), SH is set to LSA and CR is set to 0. A left shifter is adapted to supply, as the mantissa m of the result, a value obtained by executing a left shift processing having a shift amount SH on the mantissa M. A selecting circuit is adapted to supply, as the exponent e of the result, 0 when CR is equal to 1, and an output (E−LSA) of a subtracting circuit when CR is equal to 0. This enables the denormalize processing of a floating point binary number to be executed at a high speed equivalent to that at which a normalize processing is executed.

3 Claims, 8 Drawing Sheets

METHOD OF AND APPARATUS FOR NORMALIZATION OF A FLOATING POINT BINARY NUMBER

BACKGROUND OF THE INVENTION

The present invention relates to method of and apparatus for an operational processing using a binary number of a floating point representation according to the IEEE (Institute of Electrical and Electronics Engineers) Standard 754 or one which is conformed thereto.

With recent complication of scientific technical calculation or graphic procedure, there is an increased demand for a high-speed and accurate floating point operation. A computer is adapted to execute a processing using only limited digits of a floating point number. Accordingly, there often occur errors in a result obtained by a floating point operation. Operational precision considerably depends on the hardware arrangement of a computer, but by following the IEEE standard 754, errors resulting from the hardware arrangement can be prevented.

In the IEEE Std. 754, a format whose total bit number is 32 including a 1-bit sign S, an 8-bit exponent E and a 23-bit fraction F, is specified for a single-precision floating point binary number. Also, a format whose total bit number is 64 including a 1-bit sign S, an 11-bit exponent E and a 52-bit fraction F, is specified for a double-precision floating point binary number. Generally, there is used a floating point number for which normalization has been performed such that a virtual non-zero value bit and the radix point are located upper than the most significant bit (MSB) of the fraction F. However, a bias is given to an actual exponent such that the exponent E is a positive value. For single precision for example, there is used, as an exponent E, a value obtained by adding 127 as a bias to an actual exponent. That is, a real number R1 expressed as a normalized number of single precision is expressed as follows:

$$R1 = (-1)^S 2^{E-127} (1.F) \qquad (1)$$

wherein 1.F is a mantissa M.

In the IEEE Std. 754, it is defined that, when an operational result is a neighborhood value of 0, this is represented as a denormalized number. For single precision for example, the exponent E is made 0 and there is executed a denormalize processing to shift the fraction F such that the weight of the zero-value bit upper by one bit than the radix point is $2^{-126}$. In this case, a real value R2 expressed as a denormalized number is expressed as follows:

$$R2 = (-1)^S 2^{-126} (0.F) \qquad (2)$$

wherein the mantissa M is 0.F.

There is a phenomenon that the number of digits of an effective numeral is greatly decreased when there are added two numerals of which absolute values are substantially the same and of which signs are different from each other. Such a phenomenon is called "cancelling". In subtraction of floating point numbers slightly different in value from each other, when an exponent of the minuend is equal to an exponent of the subtrahend, subtraction of their mantissas is executed without a digit position justifying operation. For example, when a mantissa of the minuend is 1.100101 . . . and a mantissa of the subtrahend is 1.100010 . . . , the result of subtraction of the mantissas is equal to 0.000011 . . . Thus, when the value of the bit upper by one bit than the radix point is 0 in the result of an operation, it is said that "cancelling of mantissa" has been generated. The number of zeros which are present continuously from the position of the bit upper by one bit than the radix point, is called an amount of cancelling of mantissa. In this example, the amount of cancelling of mantissa is 5.

A floating point number presenting such cancelling of mantissa, is normalized by executing, on a mantissa M, a left shift processing having a shift amount equal to the amount of cancelling and by correcting an exponent E such that the amount of cancelling is subtracted from the exponent E. In the following description, a left shift amount required at the time when cancelling of mantissa has been generated, will be expressed as an amount of cancelling LSA.

When the exponent E is not greater than the amount of cancelling of mantissa LSA and the amount of cancelling LSA is subtracted from the exponent E for normalization, the exponent after correction becomes not greater than 0. When an operational result cannot be expressed as a normalized number, the denormalize processing above-mentioned is then required.

The hardware of a conventional computer is adapted to execute a processing of a normalized number only. More specifically, when it is judged that a value obtained by executing a normalize processing on an operational result in a hardware, cannot be expressed as a normalized number, the normalize processing is interrupted as regarded that an exception has occurred, and a denormalize processing is then entrusted to the software. Accordingly, the denormalize processing is executed after the normalize processing has been executed. This presents the problem that a desired operational result cannot be obtained at a high speed.

DISCLOSURE OF THE INVENTION

It is an object of the present invention to enable a denormalize processing of a floating point binary number to be executed at a high speed equivalent to a speed at which a normalize processing is executed.

To achieve the object above-mentioned, the present invention is arranged such that, before execution of a normalize processing, an exponent E and an amount of cancelling of mantissa LSA are compared in magnitude with each other and, based on the comparison result, either a normalize processing or a denormalize processing is executed.

According to the present invention, an exponent E and an amount of cancelling of mantissa LSA are compared in magnitude with each other, and it is judged whether the result of an operational processing is a normalized number or a denormalized number. When the result of an operational processing is a normalized number (E is greater than LSA) , the amount of cancelling LSA is selected as a shift amount SH for a mantissa M, and a value obtained by subtracting the amount of cancelling LSA from the exponent E is selected as an exponent e of the result (normalize processing). On the other hand, when the result of an operational processing is a denormalized number (E is not greater than LSA), a value obtained by subtracting 1 from the exponent E is selected as the shift amount SH for the mantissa M, and 0 is selected as the exponent e of the result (denormalize processing). More specifically, even though the result of an operational processing is a denormalized number, the processing can be executed at a high speed in the same manner as for a normalized number.

PREFERRED EMBODIMENTS

With reference to the attached drawings, the following description will discuss an operational processing method according to an embodiment of the present invention, and an operational processing apparatus to be used in the practice of the method above-mentioned.

Figure 1:
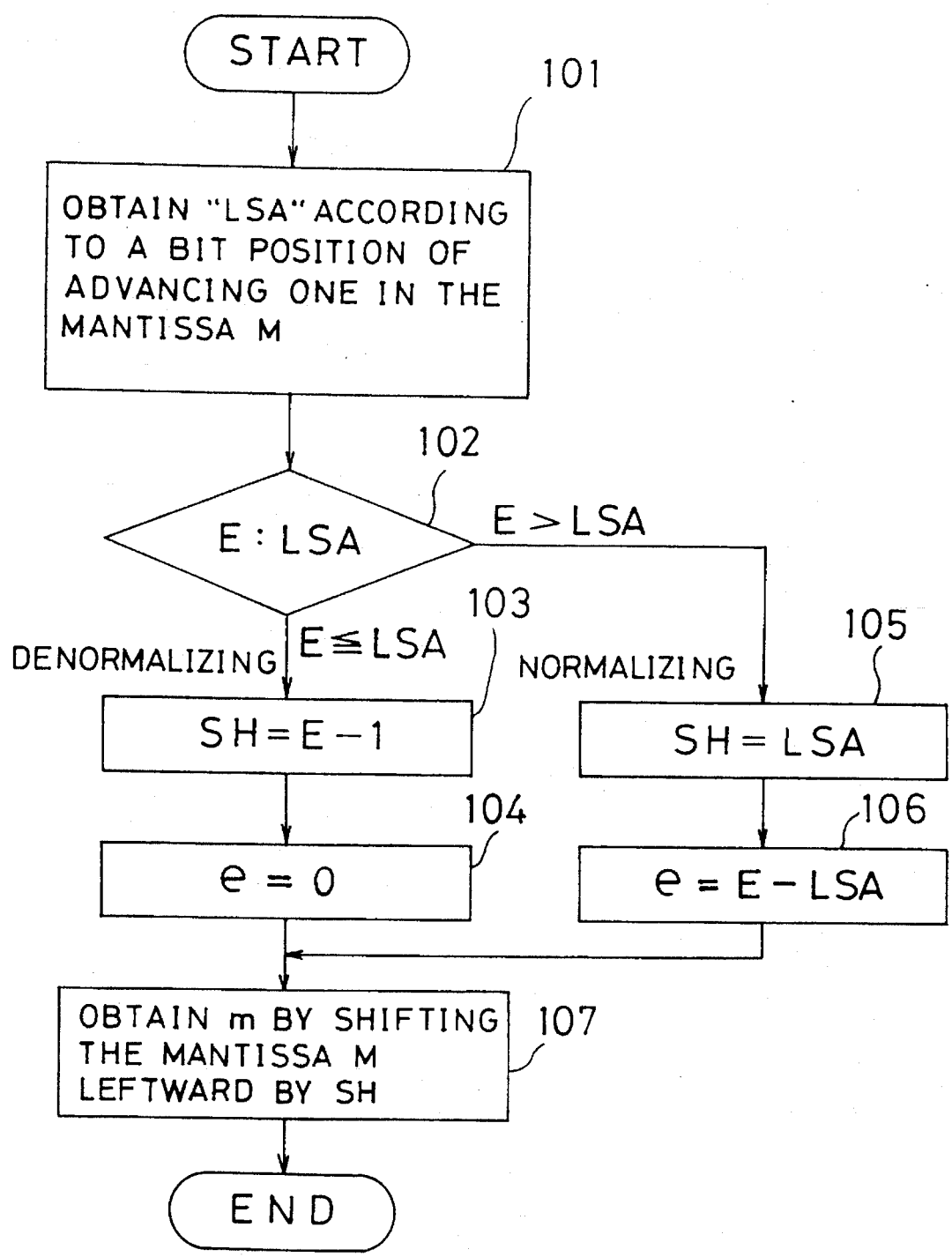
FIG. 1 is a flow chart showing the flow of a processing in an operational processing method according to an embodiment of the present invention.

FIG. 1 shows a sequence of executing a post-processing on a mantissa M and an exponent E of an input floating point binary number obtained as the result of an operation (for example, subtraction) of normalized numbers, thus converting the mantissa M and the exponent E into a mantissa m and an exponent e of an output floating point binary number. The following description will discuss the sequence, step by step, for single precision, but the operational processing method shown in FIG. 1 can also be applied for double precision.

To obtain an amount of cancelling of mantissa LSA, the bit position of the advancing 1 in a mantissa M is first detected. The amount of cancelling LSA is obtained as a difference between the bit position of the advancing 1 thus detected and the position of the bit upper by one bit than the radix point (step 101). Then, an exponent E and the amount of cancelling LSA are compared in magnitude with each other (step 102).

When E is not greater than LSA, a denormalize processing is executed such that the result of an operational processing is expressed as a denormalized number. Accordingly, it is required to decrease the exponent E such that the exponent E is equal to 0, and to execute, on the mantissa M, a left shift processing having a shift amount corresponding to the amount of such a decrease. The bit upper by one bit than the radix point in a normalized number has weight of $2^{-127}$, but the weight of such a bit in a denormalized number is $2^{-126}$ as shown in the equation (2). Accordingly, it is required that 1 bit is lessened from the shift amount when a left shift processing is executed on the mantissa M. In this connection, the shift amount SH for the mantissa is set to E−1 (step 103), and an exponent e of the result of the operational processing is set to 0 (step 104).

On the other hand, when E is greater than LSA, the shift amount SH for the mantissa is set to LSA in order to execute a normalize processing (step 105), and an exponent e of the result of an operational processing is set to E−LSA (step 106). At this time, the exponent e (=E−LSA) is positive.

At a step 107, a left shift processing is executed on the mantissa M according to the shift amount SH obtained at the step 103 or 105, thus obtaining a mantissa m of the result of the operational processing.

According to the operational processing method above-mentioned, the flow of the processing is controlled based on the result of comparison in magnitude between the exponent E and the amount of cancelling of mantissa LSA. Accordingly, even though the result of an operational processing is a denormalized number, the processing can be executed at a high speed likewise for a normalized number. Alternatively, the step 103 may be changed such that the shift amount SH is set to E instead of E−1, and a right 1-bit shift processing may be further executed on the mantissa M only when E is not greater than LSA, before or after the step 107 where the left shift processing is executed on the mantissa M.

The following description will successively discuss first to fourth operational processing apparatus to be used in the practice of the operational processing method above-mentioned.

Figure 2:
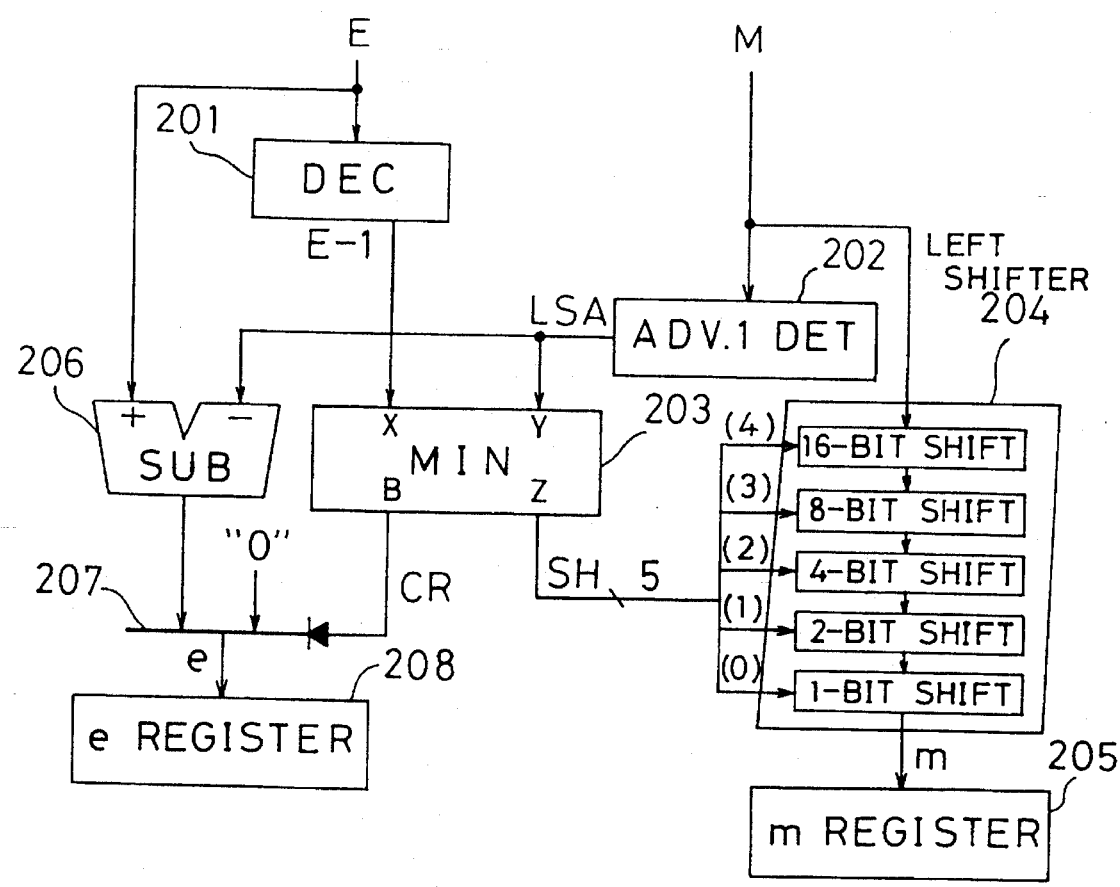
FIG. 2 is a block diagram showing the arrangement of a first operational processing apparatus according to an embodiment of the present invention.

The first operational processing apparatus shown in FIG. 2 comprises a decrementer 201, an advancing 1 detecting circuit 202, a minimum value selecting circuit 203, a left shifter unit 204, a mantissa result register 205, a subtracting circuit 206, a selecting circuit 207 and an exponent result register 208.

The decrementer 201 is adapted to supply a value obtained by subtracting 1 from an exponent E. The advancing 1 detecting circuit 202 is adapted to search a mantissa M in the direction from the bit upper by one bit than the radix point to the least significant bit (LSB), thereby to detect the position of the first bit which is equal to 1, and also adapted to supply, as an amount of cancelling LSA, a difference between the position of the bit thus detected and the position of the bit upper by one bit than the radix point. The minimum value selecting circuit 203 is adapted to compare in magnitude, with each other, two input data, i.e., an output (E−1) of the decrementer 201 and an output LSA of the advancing 1 detecting circuit 202, thereby to supply, as a shift amount SH, the input data whichever is the smaller, and to supply a magnitude-relation judging signal CR representing which input data is smaller out of the two input data. When (E−1) is smaller than LSA (that is, when E is not greater than LSA), SH is equal to E−1 and CR is equal to 1. When (E−1) is not smaller than LSA (that is, when E is greater than LSA), SH is equal to LSA and CR is equal to 0. The left shifter unit 204 is adapted to supply, as a mantissa m of the result of an operational processing, a value obtained by executing, on the mantissa M, a left shift processing having a shift amount specified by an output SH of the minimum value selecting circuit 203. The mantissa result register 205 is adapted to store an output m of the left shifter unit 204.

The subtracting circuit 206 is adapted to supply a value obtained by subtracting an output LSA of the advancing 1 detecting circuit 202 from an exponent E. The selecting circuit 207 is adapted to supply, as an exponent e of the result of an operational processing, 0 when CR is equal to 1, and an output (E−LSA) of the subtracting circuit 206 when CR is equal to 0. The exponent result register 208 is adapted to store an output e of the selecting circuit 207.

According to the arrangement in FIG. 2, the minimum value selecting circuit 203 judges whether the result of an operational processing is a normalized number or a denormalized number, based on the fact whether or not a value obtained by subtracting an output (LSA) of the advancing 1 detecting circuit 202 from an output (E–1) of the decrementer 201, is negative. The shift amount SH for the mantissa M and an exponent e of the result of an operational processing are determined such that, based on the result of the judgment thus made, either a normalize processing or a denormalize processing is to be executed. At this time, the left shifter unit 204 is commonly used for both the normalize processing and the denormalize processing.

Figure 3:
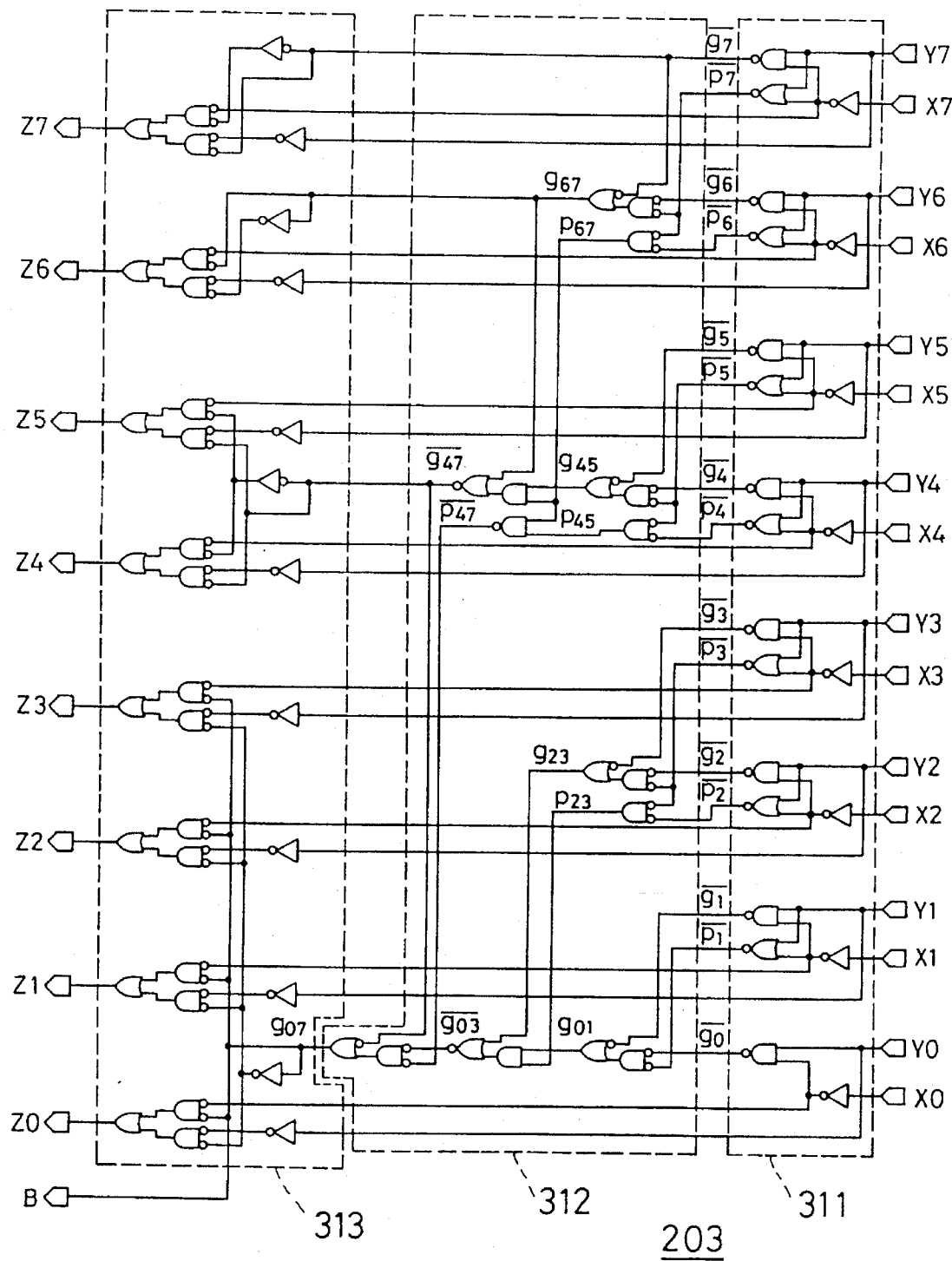
FIG. 3 is a circuit diagram showing the arrangement of the inside of a minimum value selecting circuit shown in FIG. 2.

The minimum value selecting circuit 203 in FIG. 2 has the function that two 8-bit input data X, Y are compared in magnitude with each other and the input data whichever is the smaller is set as an output data Z, and that the logical value of a magnitude-relation judging signal output terminal B is set to 1 when X is smaller than Y. As shown in FIG. 3, the minimum value selecting circuit 203 has an input circuit 311, an intermediate circuit 312 and an output circuit 313, and is arranged such that the magnitude relation of the two input data X, Y for each of the digits is propagated from the highest digit to the lowest digit, thus determining, at a high speed, an output data Z successively starting with the highest digit (See Japanese Patent Laid-Open Publication 3-12735).

When the respective bits of the input and output data X, Y, Z are set as Xi, Yi, Zi (i=0 to 7), a magnitude-relation determining function gi and a magnitude-relation holding function pi are formed for each digit in the input circuit 311. gi=1 represents that Xi is smaller than Yi, and pi=1 represents that Xi is equal to Yi.

The intermediate circuit 312 forms, based on the outputs gi and pi of the input circuit 311, a magnitude-relation determining function gjk and a magnitude-relation holding function pjk for the digits from the jth digit to the kth digit (j is smaller than k). For example, g67=1 represents the magnitude relation of two bits that X7X6 is smaller than Y7Y6, and p67=1 represents the equivalence relation of two bits that X7X6 is equal to Y7Y6. Further, g47=1 represents the magnitude relation of four bits that X7X6X5X4 is smaller than Y7Y6Y5Y4, and p47=1 represents the equivalence relation of four bits that X7X6X5X4 is equal to Y7Y6Y5Y4. These magnitude-relation determining functions gi, gjk and the magnitude-relation holding functions pi, pjk are propagated from the highest digit to the lowest digit.

When the magnitude-relation determining function gi7 for the digits from each digit (the ith digit) to the highest digit (the 7th digit) is obtained in the manner above-mentioned, Xi is selected in each digit when gi7 is equal to 1 and Yi is selected in each digit when gi7 is equal to 0. Then, Xi or Yi thus selected is set as Zi. Thus, an 8-bit output data Z (minimum value) can be obtained successively from the highest bit. In the output circuit 313 in FIG. 3, however, Z7 and Z6 are respectively determined according to g7 and g67, and Z5 and Z4 are determined according to g47, and Z3 to Z0 are determined according to g07. The magnitude-relation determining function g07 for the digits from the 0th digit to the 7th digit which is equal to 1 when X is smaller than Y, and which is equal to 0 when X is not smaller than Y, is supplied from the magnitude-relation judging signal output terminal B.

As shown in FIG. 2, the left shifter unit 204 is formed by connecting five 16-bit, 8-bit, 4-bit, 2-bit and 1-bit left shifters to one another as arranged in this order from the input side of a mantissa M. The lower five bits of an output Z7 to Z0 of the minimum value selecting circuit 203 serve as control signals of the five left shifters, respectively. More specifically, when an output (a shift amount SH) of the minimum value selecting circuit 203 is determined successively from the highest bit, the shifters in the left shifter unit 204 are successively operated, starting with the 16-bit shifter in which the amount of shift is the greatest. Accordingly, each time each of the digits of an output of the minimum value selecting circuit 203 is determined successively from the highest digit, there is executed, on a mantissa M, a left shift processing having a shift amount ($2^k$ bit) corresponding to the digit thus determined.

As thus discussed, the arrangement in FIGS. 2 and 3 has the minimum value selecting circuit 203 for determining an output data Z successively from the highest digit, and the multi-stage left shifter unit 204 having a plurality of shifters to be successively operated, starting with the shifter in which the shift amount is the greatest. This enables the left shift processing on a mantissa M to be executed at a high speed. The minimum value selecting circuit 203 is of the 8-bit arrangement and the left shifter unit 204 is of the 5-stage arrangement of left $2^k$ (k=0 to 4) bit shifters, with the number of bits of each of the mantissa M and the exponent E for single precision taken into consideration. However, such arrangements may be suitably changed according to the number of bits of each of the mantissa M and the exponent E.

Figure 4:
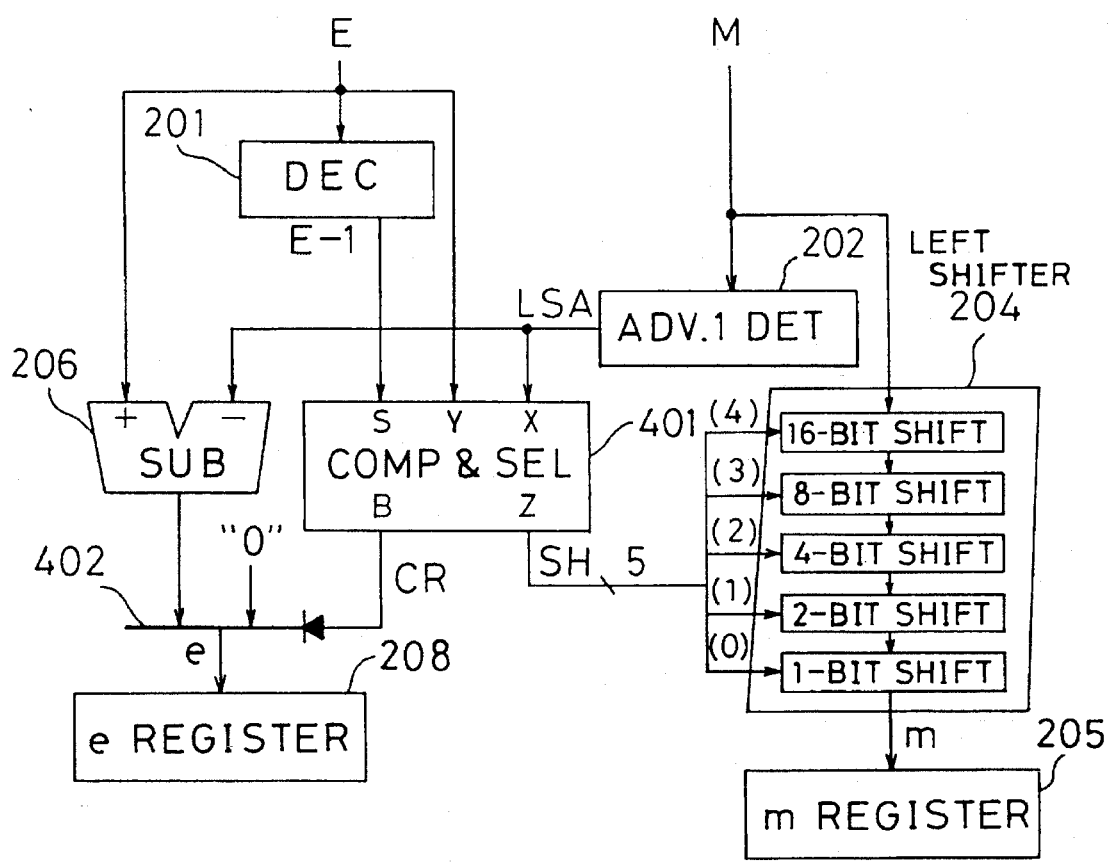
FIG. 4 is a block diagram showing the arrangement of a second operational processing apparatus according to an embodiment of the present invention.

In a second operational processing apparatus in FIG. 4, the minimum value selecting circuit 203 shown in FIG. 2 is replaced with a comparing and selecting circuit 401. A selecting circuit 402 in FIG. 4 differs from the selecting circuit 207 in FIG. 2 in that the selecting circuit 402 is adapted to supply an output (E–LSA) of the subtracting circuit 206 when CR is equal to 1, and 0 when CR is equal to 0.

The comparing and selecting circuit 401 is adapted to compare in magnitude, with each other, two input data, i.e., an output LSA of the advancing 1 detector circuit 202 and an exponent E, and to supply, as a shift amount SH, the output LSA when LSA is smaller than the exponent E, and an output (E–1) of the decrementer 201 when the output LSA is not smaller than the exponent E. Also, the comparing and selecting circuit 401 is adapted to supply a magnitude-relation judging signal CR representing which LSA or E is smaller. When LSA is smaller than E, SH is equal to LSA and CR is equal to 1, and when LSA is not smaller than E, SH is equal to E–1 and CR is equal to 0.

According to the arrangement in FIG. 4, the comparing and selecting circuit 401 is adapted to judge whether the result of an operational processing is a normalized number or a denormalized number, based on the fact whether or not a value obtained by subtracting the exponent E from an output LSA of the advancing 1 detecting circuit 202 is negative. Unlike the minimum value selecting circuit 203 in FIG. 2, the comparing and selecting circuit 401 can start comparing in magnitude two input data with each other before an output of the decrementer 201 is determined, thus enabling the judgment to be made at a higher speed. Then, the shift amount SH for the mantissa M and an exponent e of the result of an operational processing can be determined such that, based on the result of the judgment thus made, either a normalize processing or a denormalize processing is to be executed. At this time, the left shifter unit 204 is commonly used for the normalize processing and the denormalize processing.

Figure 5:
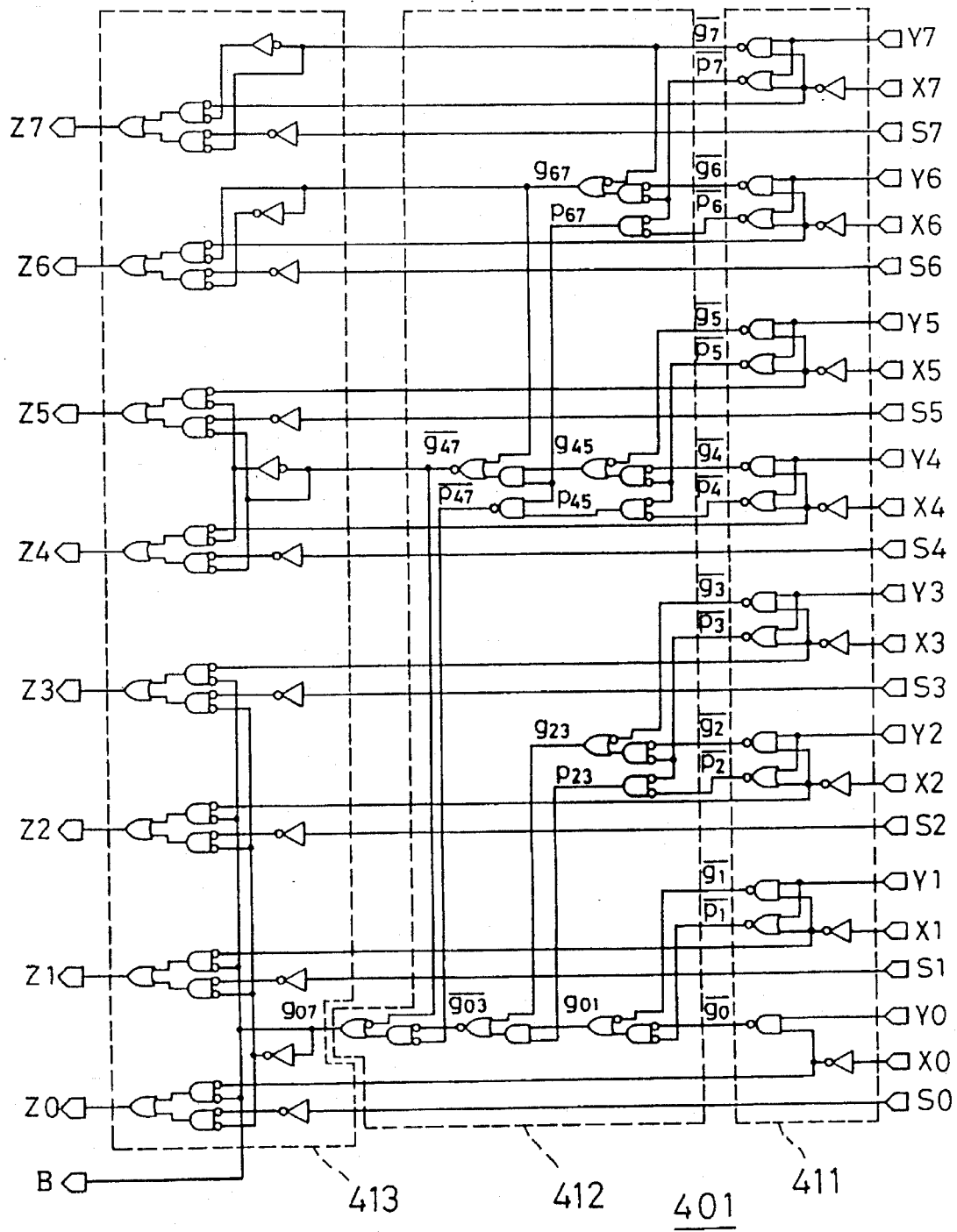
FIG. 5 is a circuit diagram showing the arrangement of the inside of a comparing and selecting circuit shown in FIG. 4.

The comparing and selecting circuit 401 in FIG. 4 has the function that first and second 8-bit input data X, Y are compared in magnitude with each other, thereby to supply, as an output data Z, X when X is smaller than Y, and a third 8-bit input data S when X is not smaller than Y, and that the logical value of the magnitude-relation judging signal output terminal B is set to 1 when X is smaller than Y. As shown in FIG. 5, the comparing and selecting circuit 401 has an input circuit 411, an intermediate circuit 412 and an output circuit 413, and is arranged, likewise the minimum value selecting circuit 203, such that the magnitude relation of the two input data X, Y for each of the digits is propagated from the highest digit to the lowest digit, thus determining, at a high speed, the output data Z starting with the highest digit.

The arrangement in FIGS. 4 and 5 has the comparing and selecting circuit 401 for determining the output data Z successively from the highest digit, and the multi-stage left shifter unit 204 having a plurality of shifters to be successively operated, starting with the shifter in which the shift amount is the greatest. This enables the left shift processing on a mantissa M to be executed at a higher speed. The comparing and selecting circuit 401 is of the 8-bit arrangement and the left shifter unit 204 is of the 5-stage arrangement of left $2^k$ (k=0 to 4) bit shifters, with the number of bits of each of the mantissa M and the exponent E for single precision taken into consideration. However, such arrangements may be suitably changed according to the number of bits of each of the mantissa M and the exponent E.

Figure 6:
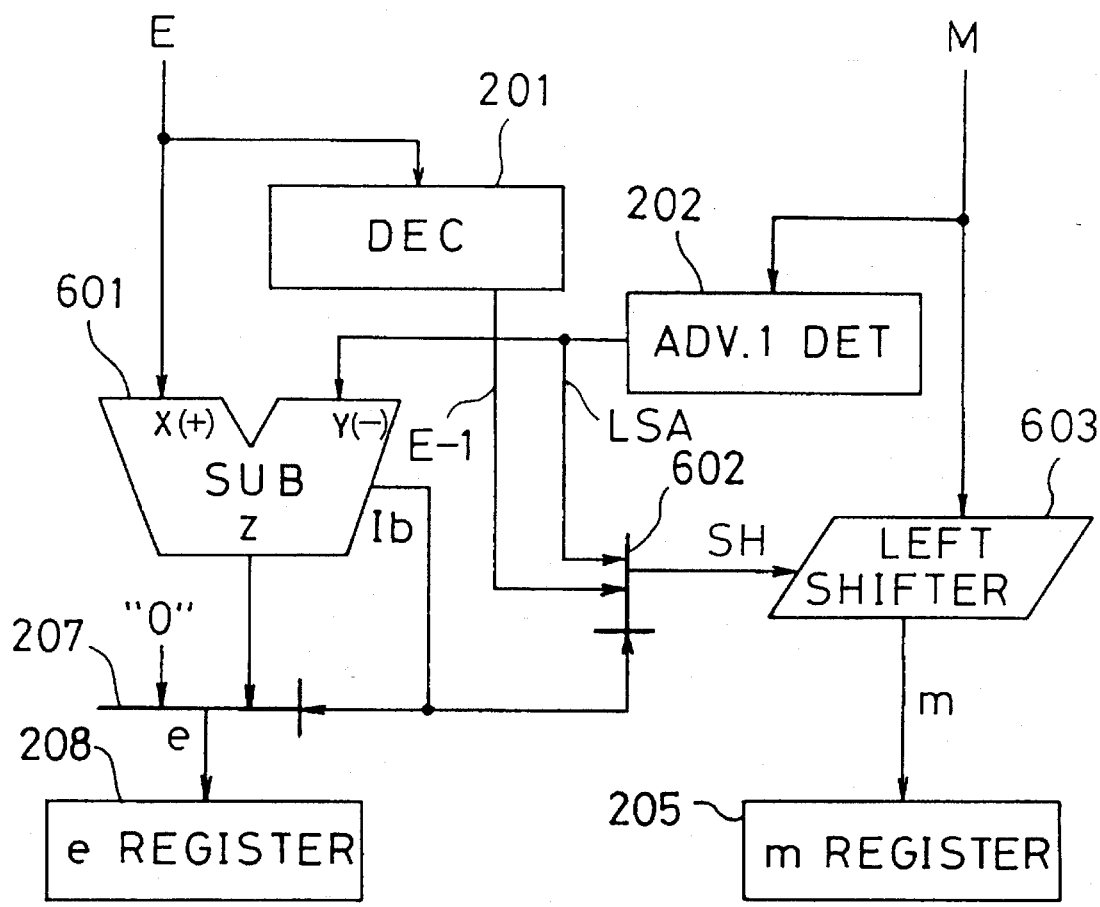
FIG. 6 is a block diagram showing the arrangement of a third operational processing apparatus according to an embodiment of the present invention.

In a third operational processing apparatus shown in FIG. 6, a decrementer 201, an advancing 1 detecting circuit 202 and a mantissa result register 205, a first selecting circuit 207 and an exponent result register 208 respectively have the same functions as those of the component elements designated by the same reference numerals in FIG. 2. In FIG. 6, there are also disposed a subtracting circuit 601, a second selecting circuit 602 and a left shifter 603.

The subtracting circuit 601 is adapted to supply, as a result of subtraction, a value obtained by subtracting an output LSA of the advancing 1 detecting circuit 202 from an exponent E, and also to supply a magnitude-relation judging signal Ib representing whether or not E is equal to or smaller than LSA. When E is not greater than LSA, Ib is equal to 1, and when E is greater than LSA, Ib is equal to 0. The first selecting circuit 207 is adapted to supply, as an exponent e of the result of an operational processing, 0 when Ib is equal to 1, and an output (E−LSA) of the subtracting circuit 601 when Ib is equal to 0. The second selecting circuit 602 is adapted to supply, as a shift amount SH, an output (E−1) of the decrementer 201 when Ib is equal to 1, and an output LSA of the advancing 1 detecting circuit 202 when Ib is equal to 0. The left shifter 603 is adapted to supply, as a mantissa m of the result of an operational processing, a value obtained by executing, on a mantissa M, a left shift processing having a shift amount specified by an output SH of the second selecting circuit 602. The inside arrangement of the left shifter 603 is not limited to the multi-stage arrangement of the left shifter unit 204 in FIG. 2.

The subtracting circuit 601 in FIG. 6 has the both functions of the subtracting circuit 206 and the minimum value selecting circuit 203 shown in FIG. 2. More specifically, the subtracting circuit 601 is adapted to supply a subtraction result (E−LSA) to be subjected to the correction of an exponent E, and to judge whether the result of an operational processing is a normalized number or a denormalized number, based on the fact whether or not a value obtained by subtracting LSA from E is equal to or smaller than 0. Then, the shift amount SH of the mantissa M and an exponent e of the result of an operational processing can be determined such that, based on the judgment thus made, either a normalize processing or a denormalize processing is to be executed. At this time, the left shifter 601 is commonly used for the normalize processing and the denormalize processing.

Figure 7:
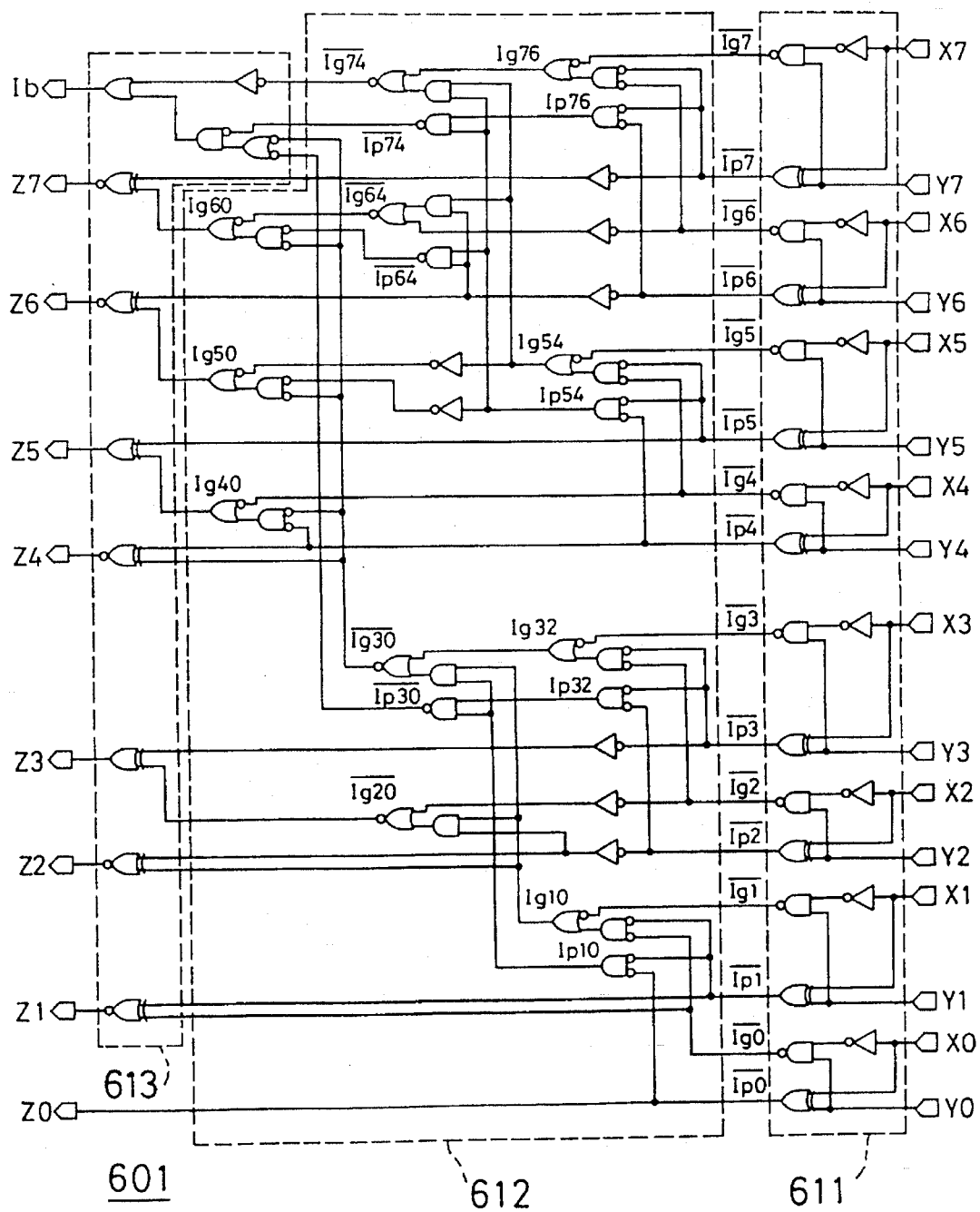
FIG. 7 is a circuit diagram showing the arrangement of the inside of a subtracting circuit shown in FIG. 6.

The subtracting circuit 601 in FIG. 6 has the function that a subtraction result (X−Y) of two 8-bit input data X, Y is set as an output data Z, and that the logical value of the magnitude-relation judging signal Ib is set to 1 when X is not greater than Y. As shown in FIG. 7, the subtracting circuit 601 has an input circuit 611, an intermediate circuit 612 and an output circuit 613, and is arranged such that the magnitude relation of the two input data X, Y for each of the digits is propagated from the lowest digit to the highest digit, thus determining the output data Z.

When the respective bits of the input and output data X, Y, Z are set as $X_i$, $Y_i$, $Z_i$ (i=0 to 7), the input circuit 611 forms a digit borrow generating signal $Ig_i$ and a digit borrow propagating signal $Ip_i$ for each digit. As widely known, the digit borrow generating signal $Ig_i$ is a signal for executing subtraction, which is formed such that $Ig_i=1$ represents that, in an operation of $X_i-Y_i$ as to the ith digit, digit borrowing has taken place from the (i+1)th digit. However, $Ig_i=1$ also represents that $X_i$ is not greater than $Y_i$. As widely known, the digit borrow propagating signal $Ip_i$ is another signal for executing subtraction, which is formed for judging that, in an operation of $X_i-Y_i$, when digit borrowing has taken place from the ith digit to the (i−1)th digit and if $Ip_i$ is equal to 1, digit borrowing has taken place from the (i+1)th digit. However, since digit borrowing from the (i+1) th digit takes place due to the digit borrowing which has taken place on the (i−1) th digit, $Ip_i=1$ also represents that $X_i$ is equal to $Y_i$.

Based on the outputs $Ig_i$ and $Ip_i$ of the input circuit 611, the intermediate circuit 611 forms a digit borrow generating signal $Ig_{jk}$ and a digit borrow propagating signal $Ip_{jk}$ for the digits from the kth digit to the j th digit (k is smaller than j). For example, the digit borrow generating signal $Ig_{32}$ from the second digit to the third digit is a signal for executing subtraction, which is formed such that $Ig_{32}=1$, represents that, in an operation of two bits of $X_3X_2-Y_3Y_2$, digit borrowing from the fourth digit has taken place. However, $Ig_{32}=1$ also represents the magnitude relation of two bits that $X_3X_2$ is not greater than $Y_3Y_2$. On the other hand, the digit borrow propagating signal $Ip_{32}$ from the second digit to the third digit is another signal for executing subtraction, which is formed for judging that, in an operation of $X_3X_2-Y_3Y_2$, when digit borrowing has taken place from the second digit to two bits of first and zeroth digits and if $Ip_{32}=1$ is equal to 1, digit borrowing has taken place from the fourth digit. Since digit borrowing from fourth digit takes place due to the digit borrowing which has taken place on the first or zeroth digit, $Ip_{32}=1$ also represents the equivalence relationship of two bits that $X_3X_2$ is equal to $Y_3Y_2$. The digit borrow generating signals $Ig_i$, $Ig_{jk}$ and the digit borrow propagating signals $Ip_i$, $Ip_{jk}$ are propagated from the lowest digit to the highest digit.

When the digit borrow generating signal $Ig_{i0}$ for the digits from the lowest digit (the zeroth digit) to each digit (the ith digit) is obtained, the output circuit 613 generates $Z_i$, for each digit, based on $Ip_i$ and $Ig_{(i-1)0}$. However, $Z_1$ is generated based on $Ip_1$ and $Ig_0$. Since no digit is borrowed from the lowest digit, $Z_0$ is determined based on $Ip_0$ only.

When at least one of a digit borrow generating signal $Ig_{70}$ and a digit borrow propagating signal $Ip_{70}$ for the digits from the zeroth digit to the 7th digit, is 1, this represents that X is not greater than Y. More specifically, the magnitude-relation judging signal Ib can be expressed by the following equation:

$$Ib = Ig70 + Ip70 \quad (3)$$

However, the following equations are established:

$$Ig70 = Ig74 + Ip74 \cdot Ig30 \quad (4)$$

$$Ip70 = Ip74 \cdot Ip30 \quad (5)$$

Accordingly, the following equation is then established:

$$\begin{aligned} Ib &= Ig74 + Ip74 \cdot Ig30 + Ip74 \cdot Ip30 \\ &= Ig74 + Ip74 \cdot (Ig30 + Ip30) \end{aligned} \quad (6)$$

In the output circuit 613 in FIG. 7, the magnitude-relation judging signal Ib is generated with the use of the relation of the equation (6).

Generally, it is easy to judge whether or not a subtraction result is negative in a subtracting circuit for executing subtraction of X–Y. That is, it is enough to judge whether or not a digit is borrowed from the highest digit. However, it is difficult to judge whether or not a subtraction result is not greater than 0. That is, it is difficult to judge whether or not a subtraction result is equal to 0. In this connection, it may be considered to add a circuit for making sure that all the bits of a subtraction result are 0 or for making sure that (X–Y) is not negative and (X–Y–1) is negative. This may increase the amount of hardware of the subtracting circuit. In the subtracting circuit 601 in FIG. 7, however, most of the hardware is commonly used for the calculation of the output data Z and the generation of the magnitude-relation judging signal Ib representing that X is not greater than Y (X–Y is not greater than 0). It is therefore possible to reduce the amount of the hardware.

Figure 8:
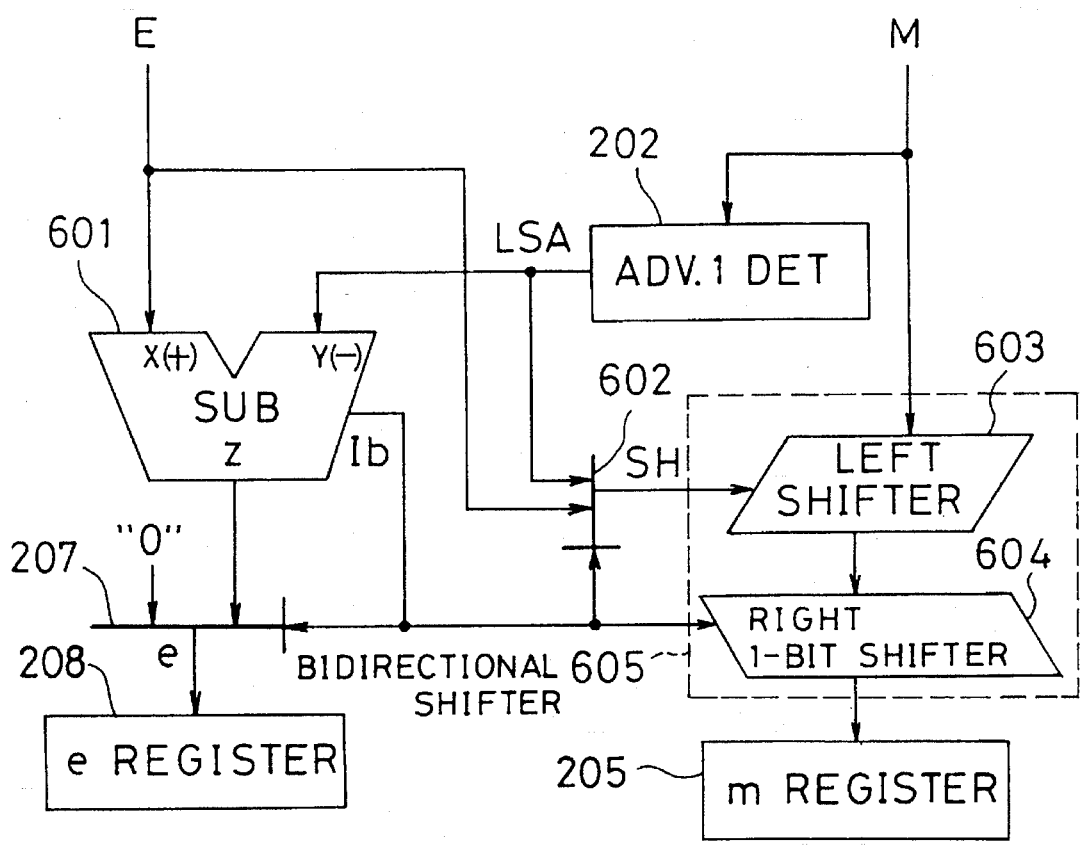
FIG. 8 is a block diagram showing the arrangement of a fourth operational processing apparatus according to an embodiment of the present invention.

In a fourth operational processing apparatus in FIG. 8, the decrementer 201 in FIG. 7 is removed but a right 1-bit shifter 604 is interposed between a left shifter 603 and a mantissa result register 205. The left shifter 603 and the right 1-bit shifter 604 form a bidirectional shifter 605.

A second selecting circuit 602 is adapted to supply, as a shift amount SH, an exponent E when Ib is equal to 1, and an output LSA of the advancing 1 detecting circuit 202 when Ib is equal to 0, the exponent E and the output LSA being supplied to the left shifter 603. The right 1-bit shifter 604 is adapted to supply, as a mantissa m of the result of an operational processing, a value obtained by executing a right 1-bit shift processing on an output of the left shifter 603 when Ib is equal to 1, and the output itself of the left shifter 603 when Ib is equal to 0.

According to the arrangement in FIG. 8, when the subtracting circuit 601 (having the inside arrangement shown in FIG. 7) makes a judgment that the result of an operational processing is a denormalized number (Ib =1), the shift amount SH to be given to the left shifter 603 is set to E and a shift operation of the right 1-bit shifter 604 is started. As a result, there is executed, on a mantissa M, a left shift processing having a desired shift amount (E–1). On the other hand, when it is judged that the result of the operational processing is a normalized number (Ib=0), the shift amount SH to be given to the left shifter 603 is set to LSA and a shift operation of the right 1-bit shifter 604 is stopped. As a result, there is executed, on a mantissa M, a left shift processing having a desired shift amount (LSA). More specifically, according to the arrangement in FIG. 8, the provision of the right 1-bit shifter 604 eliminates the decrementer 201 in FIG. 6, thus simplifying the arrangement of the operational processing apparatus. The method of determining an exponent e of the result of an operational processing is similar to that shown in FIG. 6.

In the embodiment in FIG. 8, the right 1-bit shifter 604 is disposed at the output side of the left shifter 603, but the right 1-bit shifter 604 may be disposed at the input side of the left shifter 603.

We claim:

1. An operational processing apparatus for executing a shift processing on a mantissa, having a plurality of bit positions and radix point, of a floating point binary number and for adjusting an exponent of said floating point binary number, said apparatus comprising:

advancing 1 detecting means for detecting the bit position of an advancing 1 in said mantissa and for supplying, as an amount of cancelling of said mantissa, a difference between said bit position and the bit position of a bit one bit position more significant than the radix point;

decrementing means for supplying a value obtained by subtracting 1 from said exponent;

comparing means for comparing in magnitude, with each other, two input data, i.e., an output of said decrementing means and an amount of cancelling supplied from said advancing 1 detecting means, thereby to supply, as a result of magnitude-relation judgment, the input data whichever is the smaller, and also to supply a magnitude-relation judging signal representing which input data is smaller out of said two input data;

subtracting means for supplying a value obtained by subtracting, from said exponent, an amount of cancelling supplied from said advancing 1 detecting means;

selecting means for supplying, as an exponent of a result of an operational processing, 0 when a magnitude-relation judging signal from said comparing means represents that, out of said two input data, said output of said decrementing means is smaller, and an output of said subtracting means when said magnitude-relation judging signal represents otherwise; and shifting means for supplying, as a mantissa of said result of said operational processing, a value obtained by executing on said mantissa of said floating point binary number, a left shift processing in which shift amount is equal to a result of magnitude-relation judgment, having a plurality of bits, supplied from said comparing means, wherein the comparing means has a minimum value selecting circuit to propagate the magnitude relation of the two input data for each digit thereof from a most significant digit to a least significant digit, thereby to supply the result of magnitude-relation judgment, starting with the most significant digit, and the shifting means comprises left $2^k$ (k=0, 1, 2, ..., n–1) bit shifters which respectively correspond to lower n-bits of a result of magnitude-relation judgment supplied from said minimum value selecting circuit and which are connected in cascade to one another.

2. An operational processing apparatus for executing a shift processing on a mantissa, having a plurality of bit positions and a radix point, of a floating point binary number and for adjusting an exponent of said floating point binary number, said apparatus comprising:

advancing 1 detecting means for detecting the bit position of an advancing 1 in said mantissa and for supplying, as an amount of cancelling of said mantissa, a difference between said bit position and the bit position of a bit one bit position more significant than the radix point;

decrementing means for supplying a value obtained by subtracting 1 from said exponent;

comparing and selecting means for comparing in magnitude, with each other, two input data, i.e., an amount of cancelling supplied from said advancing 1 detecting means and said exponent, thereby to supply, as a result of magnitude-relation judgment, said amount of cancelling when said amount of cancelling is smaller than said exponent, and an output of said decrementing means when said amount of cancelling is not smaller than said exponent, and also to supply a magnitude-relation judging signal representing which input data is smaller out of said two input data;

subtracting means for supplying a value obtained by subtracting, from said exponent, an amount of cancelling supplied from said advancing 1 detecting means;

selecting means for supplying, as an exponent of a result of an operational processing, an output of said subtracting means when a magnitude-relation judging signal from said comparing and selecting means represents that, out of said two input data, said amount of cancelling supplied from said advancing 1 detecting means is smaller, and 0 when said magnitude-relation judging signal represents otherwise; and shifting means for supplying, as a mantissa of said result of said operational processing, a value obtained by executing, on said mantissa of said floating point binary number, a left shift processing in which shift amount is equal to a result of magnitude-relation judgment, having a plurality of bits, supplied from said comparing and selected means, wherein the comparing and selecting means has a comparing and selecting circuit to propagate the magnitude relation of the two input data for each digit thereof from a most significant digit to a least significant digit, thereby to supply the result of magnitude-relation judgment, starting with the most significant digit, and the shifting means comprises left $2^k$ ($k=0, 1, 2, \ldots, n-1$) bit shifters which respectively correspond to lower n-bits of a result of magnitude-relation judgment supplied from said comparing and selecting circuit and which are connected in cascade to one another.

3. An operational processing apparatus for executing a shift processing on a mantissa, having a plurality of bit positions and a radix point, of a floating point binary number and for adjusting an exponent of said floating point binary number, said apparatus comprising:

advancing 1 detecting means for detecting the bit position of an advancing 1 in said mantissa and for supplying, as an amount of cancelling of said mantissa, a difference between said bit position and the bit position of a bit one bit position more significant than the radix point;

subtracting means for supplying, as a result of subtraction, a value obtained by subtracting from said exponent, an amount of cancelling supplied front said advancing 1 detecting means, and also for supplying a magnitude-relation judging signal representing whether or not said exponent is equal to or smaller than said amount of cancelling;

first selecting means for supplying, as an exponent of a result of an operational processing, 0 when a magnitude-relation judging signal from said subtracting means represents that said exponent is not greater than said amount of cancelling, and a result of subtraction supplied from said subtracting means when said magnitude-relation judging signal represents otherwise;

second selecting means for supplying said exponent when a magnitude-relation judging signal from said subtracting means represents that said exponent is not greater than said amount of cancelling, and said amount of cancelling supplied front said advancing 1 detecting means when said magnitude-relation judging signal represents otherwise; and shift processing means for supplying, as a mantissa of said result of said operation processing, a value obtained by executing, on said mantissa of said floating point binary number, a left shift processing in which shift amount is equal to a value obtained by subtracting 1 from an output of said second selecting means when a magnitude-relation judging signal from said subtracting means represents that said exponent is not greater than said amount of cancelling, and in which said shift amount is equal to said output itself of said second selecting means when said magnitude-relation judging signal represents otherwise, wherein the shift processing means has:

a left shifter for supplying a value obtained by executing, on the mantissa, a left shift processing in which shift amount is equal to an output of the second selecting means; and a right 1-bit shifter for supplying, as a mantissa of the result of an operational processing, a value obtained by executing a right 1-bit shift processing on an output of said left shifter when a magnitude-relation judging signal from the subtracting means represents that the exponent is not greater than the amount of cancelling, and said output itself of said left shifter when said magnitude-relation judging signal represents otherwise.

* * * * *